United States Patent [19]

Wilson

[11] Patent Number: 5,289,799
[45] Date of Patent: Mar. 1, 1994

[54] AUTOMATIC PET RELIEF STATION

[76] Inventor: John T. Wilson, 191 Centennial Avenue, Beaconsfield, Quebec, Canada, H9W 2J6

[21] Appl. No.: 981,335
[22] Filed: Nov. 25, 1992
[51] Int. Cl.⁵ .................................................. A01K 29/00
[52] U.S. Cl. ..................................................... 119/164
[58] Field of Search ................. 119/163, 164, 166, 17, 119/19

[56] References Cited

U.S. PATENT DOCUMENTS

| | | | |
|---|---|---|---|
| 3,747,563 | 7/1973 | Brockhouse | 119/163 |
| 3,871,331 | 3/1975 | Breav | 119/164 |
| 4,011,837 | 3/1977 | Ksioszk . | |
| 4,465,018 | 8/1984 | Mopper | 119/163 |
| 4,493,288 | 1/1985 | van der Kolk . | |
| 4,729,342 | 3/1988 | Loctin | 119/163 |
| 4,787,334 | 11/1988 | Bassine . | |
| 4,844,011 | 7/1989 | Strickland | 119/164 |
| 5,003,920 | 4/1991 | Miksitz | 119/163 |

Primary Examiner—Gene Mancene
Assistant Examiner—Thomas Price
Attorney, Agent, or Firm—Christensen, O'Connor, Johnson & Kindness

[57] ABSTRACT

Disclosed is an automatic pet relief station (10) consisting of a housing (12) with an opening (14) to permit entry and exit of pets, an endless belt (16) positioned within the housing (12) to support a pet, a dispenser (18) positioned within the housing (12) for distributing litter on the endless belt (16), and a recycler (20) to cleanse soiled litter, dry the cleansed litter, and deposit the cleansed litter in the dispenser (18) for reuse.

After a pet uses the relief station (10), the endless belt begins to travel, with soiled litter being received by the recycler (20) from one end of the endless belt (16), while clean litter is evenly distributed upon the opposite end of the endless belt (16) by the dispenser (18) as the endless belt (16) moves beneath the dispenser (18), thereby replacing the soiled litter. The recycler (20) cleanses the soiled litter, dries the cleansed litter, and deposits the dry cleansed litter into the dispenser (18) for reuse.

25 Claims, 7 Drawing Sheets

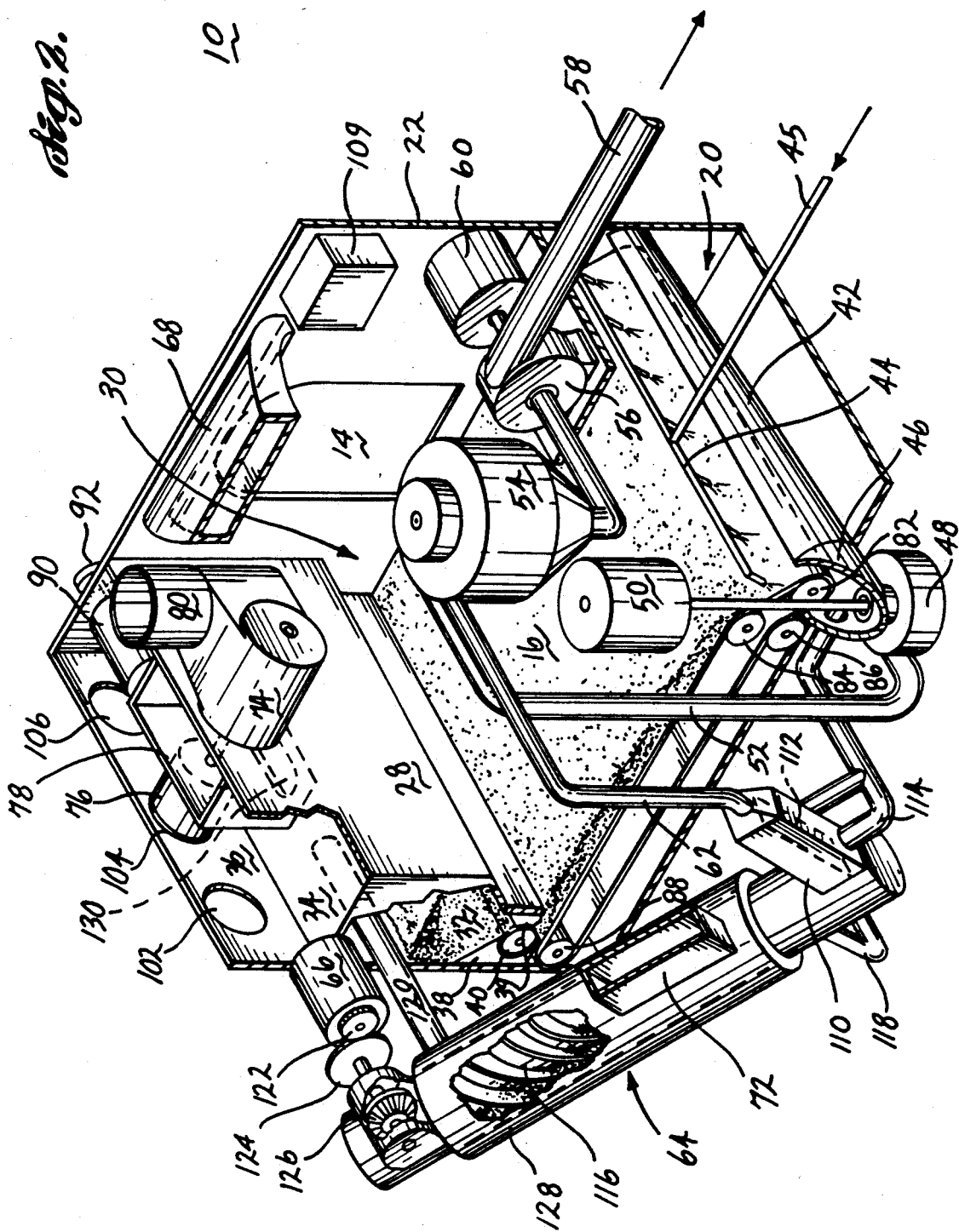

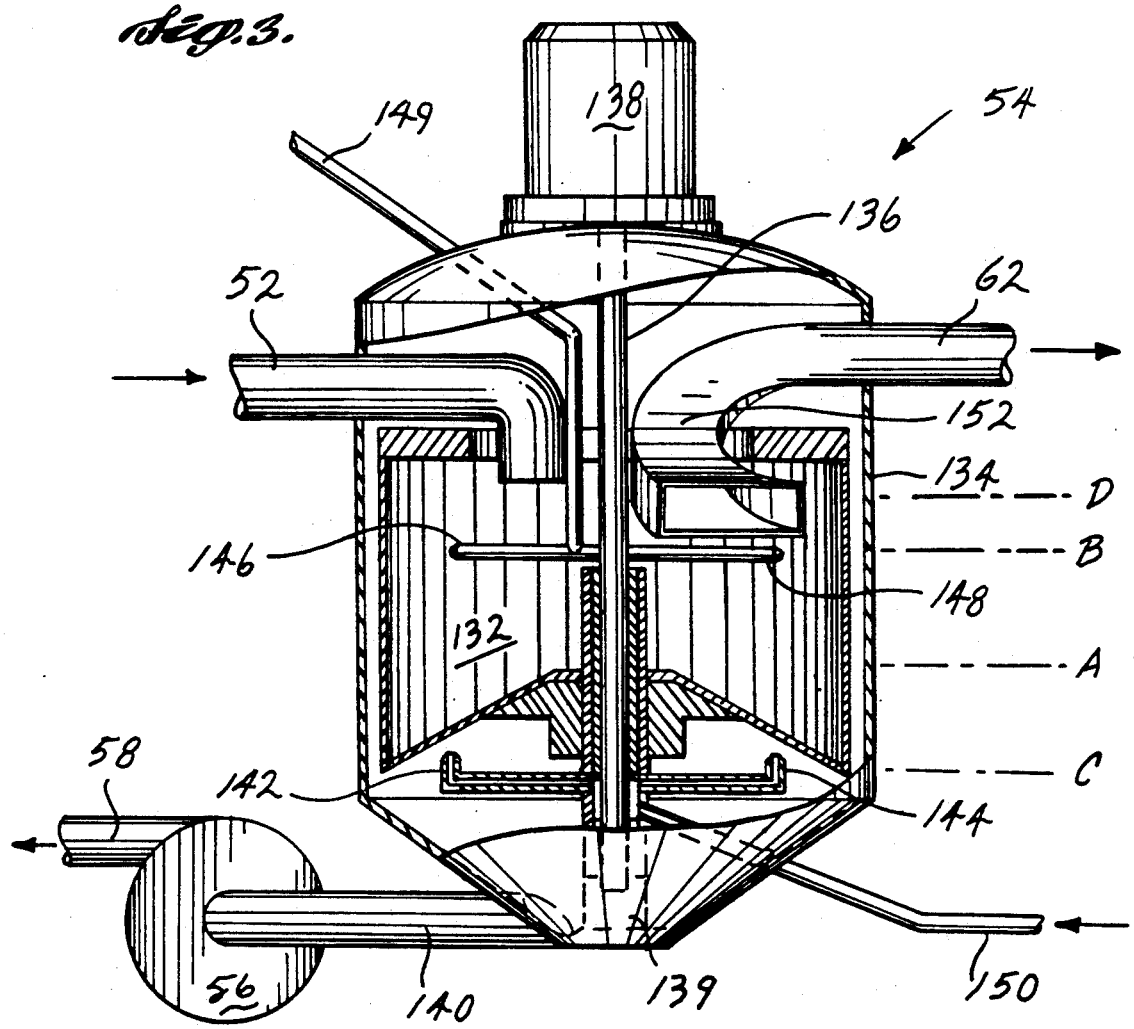
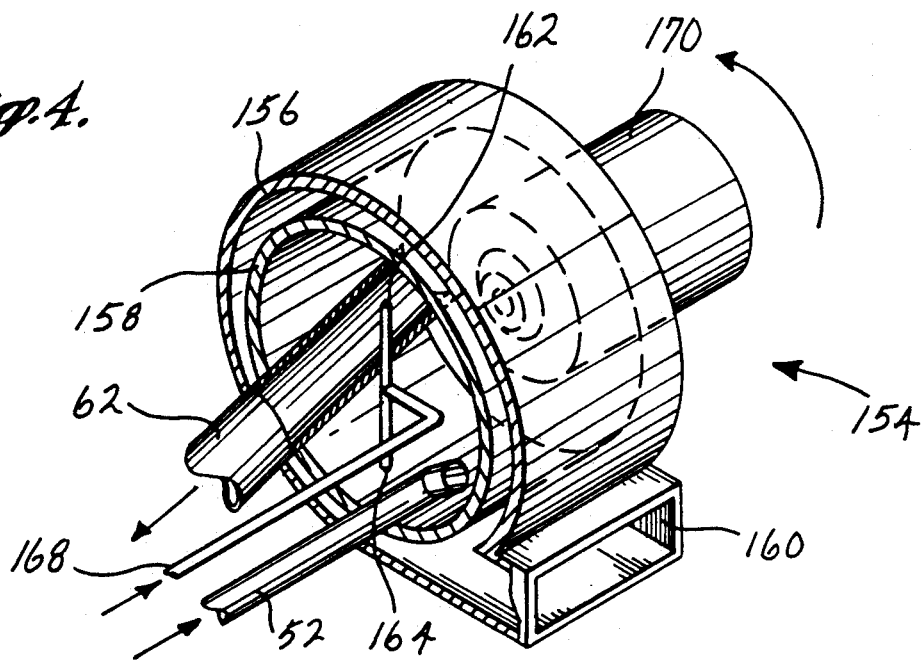

AUTOMATIC PET RELIEF STATION

FIELD OF THE INVENTION

The present invention relates to pet relief stations and, more particularly, to automatic pet relief stations that recycle used litter.

BACKGROUND OF THE INVENTION

Trays or other containers with absorbent litter therein are commonly used by cats or other pets for excretion of wastes. The wastes must frequently be removed from the litter, or the litter must be changed, to prevent odors and for hygienic reasons. Even if wastes are frequently removed from the litter, at some point the litter must be completely replaced because there is no method known in the art to completely remove all waste from the litter.

Various devices that provide a litter box or pet relief station are known in the art. For example, U.S. Pat. No. 4,011,837 issued to Ksioszk, discloses a self-cleaning animal kennel in which an impervious sheet is moved along the floor of the kennel. Absorbent paper and a deodorant is automatically applied over the impervious sheet and collected animal waste, as the sheet passes from the kennel floor with the two superimposed sheets and captured waste being rolled up on a drum.

U.S. Pat. No. 4,465,018, issued to Mopper, discloses an indoor pet relief station in which a plastic sheet is dispensed from a roller and is moved across the floor of the device by a motor driven take-up roll. Fresh litter, dispensed from a hopper, is deposited on the surface of the moving plastic sheet. As the plastic sheet passes onto the take-up roll, soiled litter falls downwardly into a disposable collection bag. A screen positioned immediately above the collection bag allows the used litter to pass into the collection bag, but prevents passage of solid waste. According to the Mopper patent, the filtered litter can be reused, while the separated solid waste is disposed of. However, it is readily apparent to those skilled in the art, that merely filtering litter neither removes all waste from the litter, nor prevents the buildup of odor and unsanitary conditions.

A pet relief station disclosed in U.S. Pat. No. 4,493,288, which issued to van der Kolk, includes a hopper for supplying litter to the upper end of a conveyor belt. When an animal enters the litter box, the conveyor belt operates to move used litter from the lower end of the conveyor belt into a container. Simultaneously, fresh litter is deposited by the hopper.

In a pet relief station disclosed in U.S. Pat. No. 4,787,334, which issued to Bassine, litter is deposited by a supply hopper onto a movable plastic sheet. When a crank is turned, the sheet is wound on a roller, sealing the used litter in the rolled up plastic sheet.

Although prior art devices of the above-described type may be satisfactory in some situations, various disadvantages and drawbacks exist. For example, none of the described devices provide for the cleansing or otherwise recycling of used litter, or its automatic resupply to a storage hopper.

SUMMARY OF THE INVENTION

The invention provides a pet relief station that includes a housing, with an opening in the housing to permit a pet to enter and exit the housing. Located within the housing is an endless belt or other structure that is positioned to support an animal that enters the housing. A dispenser is located at one end of the endless belt for depositing litter on the surface of the belt. A recycler for cleansing used litter and transporting the cleansed litter to the dispenser for reuse is located at the second end of the belt.

The present invention is a substantial improvement over prior art, which does not include means for recycling used litter, or means for automatically resupplying the recycled litter for reuse.

The overall operation of the pet relief station is as follows. After an animal enters the pet relief station and exits, the endless belt is caused to travel, thereby depositing soiled litter in the recycler from the endless belt. Simultaneously, the dispenser deposits clean litter on the opposite end of the endless belt. The recycler washes the soiled litter, dries it, and deposits the clean litter back in the dispenser. In embodiments of the invention in which the recycler is only capable of processing part of the soiled litter at one time, the endless belt travels in a series of steps until all of the soiled litter has been received by the recycler, and has been replaced by clean litter from the dispenser.

The currently preferred embodiments of the invention include a microprocessor for controlling the operation of the pet relief station based upon inputs from various sensors. The sensors include a visitor presence sensor, liquid level and air temperature, and flow sensors located within the recycler. When the visitor presence sensor indicates that an animal has both entered and exited the pet relief station, the microprocessor initiates the relief station cleansing and recycling sequence.

During the cleansing and recycling sequence, signals supplied by the liquid level, air temperature and flow sensors cause the microprocessor to open and close valves, and to start, stop, and reverse the direction of motors.

In accordance with the present invention, two recycler embodiments are provided for cleansing and recycling used litter. The first embodiment of the recycler employs litter that floats in water, with soiled litter being supplied to a cylindrical chamber that is formed of screen or other mesh-like material. The cylindrical chamber is mounted within a second chamber, which serves as a fluid bath with the longitudinal axis of the cylindrical chamber being substantially vertical. A cleansing fluid is introduced into the second chamber via valves and the cylindrical chamber that includes the litter being cleansed is rotated to provide cleansing action to the litter particles. Following a clean water rinse cycle, clean litter particles that float to the surface are collected, dried and supplied to the litter dispenser for subsequent reuse.

The second recycler embodiment can be used with litter that is composed of washable particles that may or may not float in water. As in the first recycler embodiment, soiled litter is supplied to a cylindrical chamber that is formed of a screen or other mesh-like material. Although the cylindrical chamber of the second embodiment also is mounted for rotation within a second chamber, the axis of rotation is horizontal. When soiled litter is introduced into the cylindrical chamber, the chamber is rotated at a rate that causes the litter to be forced against the inside wall of the chamber because of centrifugal force. Cleansing fluid, introduced into the cylindrical chamber by spray nozzles, washes the litter while it is being spun. After the litter has been washed, the rotation rate is reduced to the point at which litter falls downwardly from the top of the rotating cylindrical chamber. The falling litter is collected by an upwardly opening intake flange, which is positioned near the center of the cylindrical chamber. Litter collected by the intake flange is dried and supplied to the litter dispenser for reuse.

In both the first and second embodiments of the recycler, drying of the wet litter is achieved as the litter is moved through a duct by a rotating screw conveyor. While the litter is being transported through the duct by the screw conveyor, the litter is exposed to warm air that is supplied by a fan and heater.

In some situations, it can be advantageous to configure either the first or second recycler embodiment as a free-standing unit. In such an arrangement, soiled litter is manually input into a receiving hopper of the recycler, which then cleanses the soiled litter and dries it for reuse.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 is a partially cut away rear perspective view of the embodiment of FIG. 1;

FIG. 3 is a partially cut away perspective view of one type of separator/washer that can be employed in a device constructed in accordance with the present invention;

FIG. 4 is a perspective view of a second type of separator/washer that can be used in the practice of the present invention;

DETAILED DESCRIPTION OF THE PREFERRED EMBODIMENTS

Figure 1:
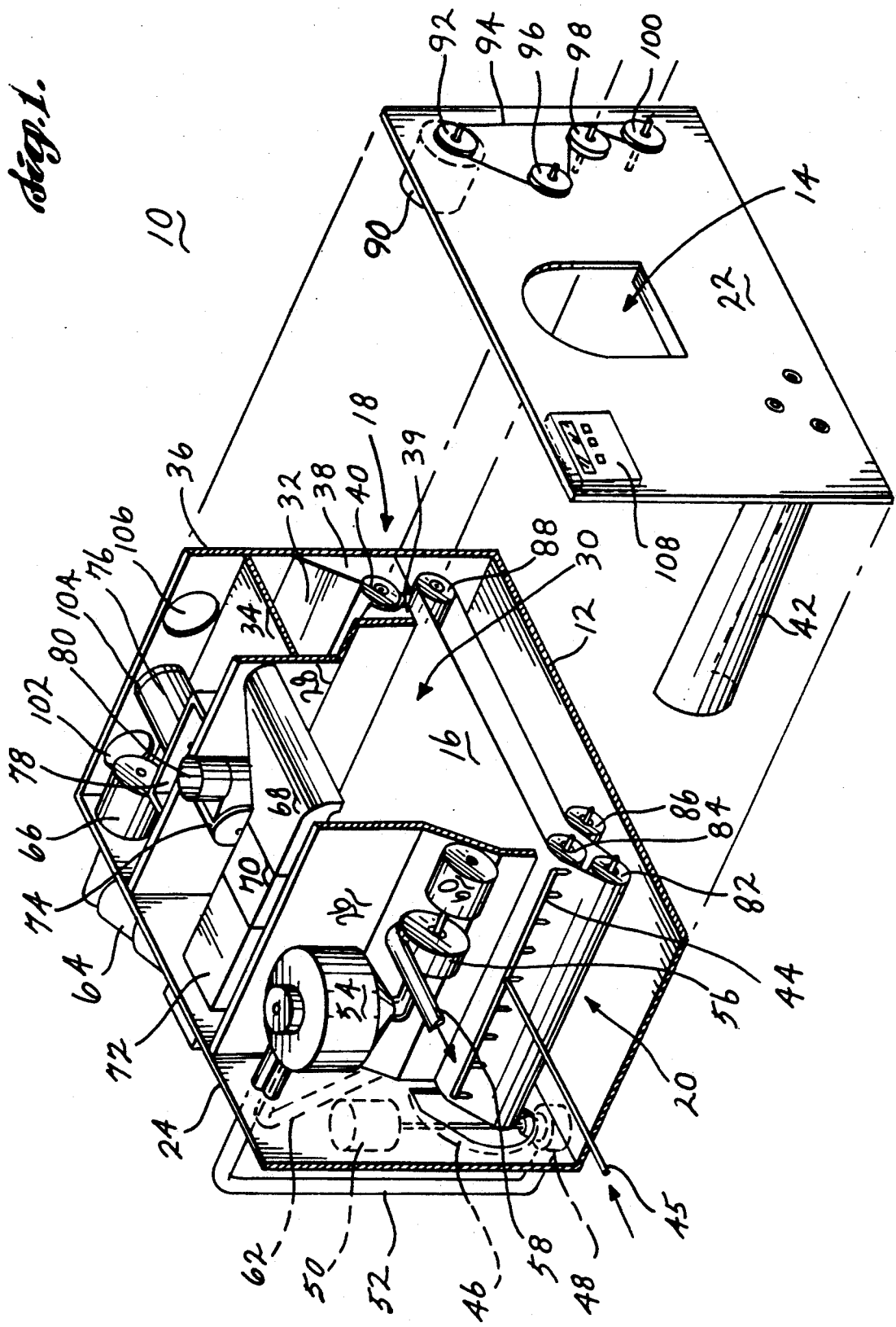
FIG. 1 is a frontal perspective view of a device constructed in accordance with the present invention, with the front panel shown exploded away to reveal internal detail.

Referring to FIG. 1, the currently preferred embodiment of a pet relief station constructed in accordance with the invention includes a housing 12 having an opening 14 that permits a pet to enter and exit the housing. Within the housing 12 is an endless belt 16, which is positioned to support litter on its upper surface. The pet relief station (generally identified by the reference numeral 10) also contains a dispenser 18 for distributing litter at one end of the endless belt 16 and a recycler 20 at the other end for collecting and cleansing the used litter. As shall be described in greater detail, the dispenser 18 includes a litter storage bin 32, a dispensing roller 40, a motor 90 that drives dispensing roller 40 via a drive belt 94 and pulleys 92, 96, 98, and 100. As also shall be described in greater detail, recycler 20 includes a separator/washer 54 for washing and removing waste from used litter, a dryer/conveyor 64 (FIG. 2) for drying the cleansed litter and supplying it to the litter storage bin 32 for reuse, and a collection chamber 42, pump 48, and motor 50 for collecting soiled litter and conveying it to the separator/washer 54.

An animal wishing to use the relief station 10 enters through the opening 14 and is supported upon the upper surface of the endless belt 16. As can be seen in FIG. 1, an animal using the relief station 10 has access to an enclosed area that is identified herein as pet reception area 30 and which is bounded by panels 22, 24, 26, and 28. In the depicted arrangement, panel 22 includes the opening 14 and extends vertically to form both the front panel of pet relief station 10 and the front wall of the pet reception area 30. Panel 24 is spaced apart from panel 22 and extends vertically to form the rear panel of pet relief station 10 and the rear wall of the pet reception area 30. Panels 26 and 28 form the left and right walls, respectively, as viewed from the front of the pet reception area 30. Panels 26 and 28 are generally vertical, but contain two bends so that there is more space at the bottom of the pet reception area 30 than at the top.

Dispenser 18 of FIG. 1 includes a hopper-like litter storage bin 32 that is positioned above one end of endless belt 16 and extends along the entire width of the endless belt. In the arrangement of FIG. 1, the inner wall of the litter storage bin 32 (left wall in FIG. 1) is formed by panel 28. As previously described, panel 28 also defines the right wall of pet reception area 30. The wall of litter storage bin 32 opposite the wall defined by panel 28 is formed by a substantially vertical panel 36 (which forms an outside (right) wall of pet relief station 10) and by a block 38 that initially extends inwardly and downwardly away from the panel 36 and then extends vertically downward toward the upper surface of endless belt 16. The inward face of the vertically extending portion of block 38 is arcuately contoured to match the radius of a dispensing roller 40.

As can be seen in FIG. 1, the inwardly and downwardly extending region of block 38 in effect matches the first bend of the previously mentioned two bends in panel 28 so that the upper wall regions of litter storage bin 32 uniformly converge toward one another. Moreover, and as is also shown in FIG. 1, the vertically extending portion of hopper panel 36 begins at a point that is spaced apart from the second bend of panel 28 so that a channel-like litter dispensing region is defined at the lower end of the litter storage bin 32. In addition, mounted to hopper panel 28 is a block 39 that faces block 38 and is arcuately contoured to match the radius of dispensing roller 40. Collectively, the arcuate faces of blocks 38 and 39 nearly enclose the dispensing roller 40, except for a small space at the top and bottom of the dispensing roller 40. This configuration forms a narrow channel that directs the litter into the dispensing roller 40, and from the dispensing roller 40, onto the endless belt 16.

Roller 40 extends between regions of pet relief station front and rear panels 22 and 24, which respectively form the front and rear walls of litter storage bin 32. An upper panel 34 extends between panels 28 and 36 to substantially enclose litter storage bin 32. Blocks 38 and 39 also extend between the front and rear panels 22 and 24 of the pet relief station 10 to channel the litter onto the dispensing roller 40, and then onto the endless belt 16, as just described.

As shall be described in more detail, when litter is to be distributed on the endless belt 16, the belt is driven so that the upper surface of the endless belt 16 moves away from the litter storage bin 32, i.e., right to left in FIG. 1. As the endless belt begins to move, the dispensing roller 40 is rotated to function as a spreader and spread litter across the width of the endless belt 16. In the preferred embodiment, the dispensing roller 40 includes several concave cavities uniformly spaced around its circumference, with each cavity sized to dispense a predetermined amount of litter as the dispensing roller 40 is rotated at a speed that is synchronized with the movement of endless belt 16. Arrangements other than a dispensing roller that includes circumferentially spaced apart cavities can be used. For example, brushes or tines that are spaced around the circumference of a rotating cylinder can be employed.

Synchronization between the movement of endless belt 16 and the rotational speed of dispensing roller 40 results in uniform distribution of litter on the upper surface of endless belt 16. In the arrangement of FIG. 1, this synchronization (timing) is achieved by driving the dispensing roller 40 and endless belt 16 with a common drive belt 94, which encircles pulleys 92, 96, 98, and 100. It will be readily appreciated by those skilled in the art, that it not necessary to drive the endless belt 16 and dispensing roller 40 by the same drive belt 40, but that the rate of travel of the endless belt 16 and the rotation of the dispensing roller 40 could each be adjusted individually with respect to each other to achieve even distribution of the litter upon the endless belt 16.

At the opposite end of the endless belt 16 from the litter storage bin 32, soiled litter drops off the end of the endless belt 16 into a collection chamber 42 that extends orthogonally from front panel 22 of pet relief station 10 and forms a portion of the previously mentioned recycler 20. In operation, the endless belt 16 must travel a distance equal to the distance between panels 26 and 28 to replace the litter within pet relief station 10. As shall be described in more detail, in embodiments of the invention in which the recycler 20 cannot handle the entire quantity of litter that is required to completely cover the upper surface of endless belt 16, the soiled litter is recycled in batches, with the endless belt 16 being moved to supply used litter to collection chamber 42 and the process being repeated until all soiled litter on the endless belt 16 has been replaced with clean litter.

As was previously indicated, the portion of the endless belt 16 that is within pet reception area 30 in effect defines a floor for supporting litter and a pet and, thus, is substantially horizontal. However, in the currently preferred embodiments of the invention, a portion of the endless belt 16 extends outwardly from the left side of the pet reception area 30 and is sloped downwardly toward collection chamber 42. This configuration is advantageous since it ensures that all soiled litter falls from the endless belt 16 and into the collection chamber 42, which is located immediately below and partially surrounding the lower end of the endless belt. A series of spaced-apart, downwardly directed spray nozzles 44 are positioned above the downwardly sloped portion of the endless belt 16 to discharge liquid spray that helps sweep the soiled litter off of the endless belt 16 into the collection chamber 42. In the depicted arrangement, the liquid is supplied to the spray nozzles 44 by a supply pipe 45 which is described in more detail hereinafter. Although water is used in the currently preferred embodiments of the invention, it will be recognized that a fluid other than water can be used and that deodorizers and disinfectants can be included in the water or other fluid. Furthermore, the disinfectants may include substances that serve to effectively sterilize the soiled litter.

As can best be seen in FIG. 2, the collection chamber 42 spans the entire width of the endless belt 16 extending from the pet relief station front panel 22 to the rear panel 24. At the end of the collection chamber 42 that abuts against the rear wall 24 of the pet reception area 30 is an end molding 46 (FIG. 1) that receives material collected in the collection chamber 42 (soiled litter and fluid supplied by spray nozzles 44) and directs the material into a centrifugal pump 48 that is located directly below the end molding 46. To direct material to centrifugal pump 48, the collection chamber 42 slopes downwardly toward the rear wall 24. Spray nozzles 44 are also angled to point rearward toward the end molding 46 and pump 48, to force material along the collection chamber 42 toward the pump.

In the depicted arrangement, the shaft of the centrifugal pump 48 extends vertically with a motor 50 that drives the pump 48 being mounted to the outside of rear wall 24, directly above the pump 48. In operation, material collected by the collection chamber 42 is supplied to the centrifugal pump 48 via a passage in end molding 46, and is pumped through an upwardly extending pipe 52 to a separator/washer 54.

In the preferred embodiment, the spray nozzles 44 continue to spray liquid, and the centrifugal pump 48 continues to operate until all of the soiled litter is flushed from collection chamber 42 and pumped into the separator/washer 54 through the separator/washer input pipe 52. Further, the spray nozzles 44 preferably continue to operate for a short period after the centrifugal pump 48 shuts off. This ensures the collection chamber centrifugal pump 48 will be filled with clean liquid, which forms a drain trap and prevents odors from passing from the separator/washer input pipe 52 and back through the centrifugal pump 48 and into the pet reception area 30 and entrance 14 of the relief station 10.

As is shown in FIG. 1, the separator/washer 54 is located adjacent to the top, rear portion of the panel 26 that forms the left vertical boundary of the pet reception area 30 at a position that is between the panel 26 and the left side of pet relief station 10. This places the separator/washer 54 outside pet reception area 30, directly above the endless belt 16. As also is shown in FIG. 1, the input pipe 52 to the separator/washer 54 runs from the centrifugal pump 48 at the base of the rear panel 24 of pet relief station 10, up the outside of the rear panel 24 to the elevation of the separator/washer 54, then through the panel 24 to the separator/washer 54. As shall be described in detail relative to FIGS. 3 and 4, the separator/washer 54 washes the soiled litter, separates the washed litter from any remaining waste, and removes the majority of the wash fluid.

As can be seen in both FIGS. 1 and 2, waste from the separator/washer 54 is pumped from the bottom of the separator/washer 54 by a horizontal axis centrifugal pump 56 that is located adjacent to and slightly below the separator/washer 54. An output pipe 58 extending from the horizontal axis centrifugal pump 56 connects to the household sewage drain. For example, the currently preferred practice is to connect the outlet end of the output pipe below the trap of a bathroom or utility room sink or basin. With continued reference to FIGS. 1 and 2, a motor 60 that drives the horizontal axis centrifugal pump 56 is mounted adjacent to the pump 56, on the side of the pump that is opposite the separator/washer 54.

Located on the upper portion of separator/washer 54 is an outlet pipe 62, through which is discharged clean litter and a residual amount of wash fluid. With specific reference to FIG. 1, the output pipe 62 extends from the separator/washer 54, and passes through the rear panel 24 of the pet relief station 10 to a dryer/conveyor assembly 64. As is shown in FIG. 2, a motor 66 that drives the dryer/conveyor 64 is located at the top of the right, rear corner of the pet relief station 10. The motor 66 is mounted to the inside of the rear panel 24.

The centrifugal pumps 48 and 56 and their motors 50 and 60 operate in combination with the separator/washer 54 and spray nozzles 44, serving as an evacuator to remove soiled litter from the collection chamber 42 and to cleanse the soiled liter. As can best be seen in FIG. 2, the clean litter and liquid that is discharged from the separator/washer 54 via output pipe 62 enters the dryer/conveyor 64 through an entrance fitting 110. Located within the interior of entrance fitting 110 is a screen or mesh 112 sized to prevent passage of litter particles. The screen 112 separates most of the water from the clean litter with the water that flows through screen 112 passing into a drain pipe 114 that connects entrance fitting 110 with the collection chamber centrifugal pump 48.

Litter particles that cannot pass through the mesh 112 pass into a portion of the dryer/conveyor 64 that contains a screw conveyor 116. As can be seen in FIG. 2, screw conveyor 116 is housed within a cylindrical housing 128 that forms the major portion of the dryer/conveyor 64. As also shown in FIG. 2, dryer/conveyor 64 extends angularly upward from the left rear corner region of pet relief station 10 to the litter storage bin 32. When screw conveyor 116 is rotated to move clean litter from the entrance fitting 110 to an outpipe 120 that extends into the upper central region of litter storage bin 32, excess water flows downwardly along housing 128 to the lower end of the screw conveyor. This excess water is drawn to the collection chamber centrifugal pump 48 via a drain pipe 118 and the drain pipe 114.

As is most clearly shown in FIG. 2, screw conveyor 116 is driven by a motor 66 that is mounted to the inside of the rear panel 24 of the pet relief station 10 at a position above the litter storage bin 32. In this arrangement, the shaft of motor 66 extends perpendicularly through the relief station wall 24 (not shown in FIG. 2) and drives a gear 122. The gear 122 meshes with a gear 124, which is connected by a shaft to a bevel gear 126. The bevel gear 126, in turn, meshes with a second beveled gear (not shown), which rotates the screw conveyor 116.

While the preferred embodiment uses a rotating screw conveyor 116 to convey cleansed litter back to the litter storage bin 32, those skilled in the art can readily appreciate that many other types of conveyors may be used to accomplish the same result. For example, a bucket conveyor, an endless belt conveyor, or a movable hopper on an elevator mechanism, are all substantially similar means of accomplishing the same result.

Returning to the dryer/conveyor 64 of the preferred embodiment, the inner cylindrical wall of housing 128 is perforated with many small holes that allow air to pass inwardly through the housing, and further to pass through the litter and upward along the axis of screw conveyor 116. At its lower end, the housing 128 connects to heater duct 72, which supplies heated drying air to the interior of housing 128.

As can best be seen in FIG. 1, the heater duct 72 extends vertically, in spaced-apart juxtaposition with the rear panel 24 and passes inwardly through the rear panel 24 to extend into pet reception area 30. Connected to heater duct 72 is a heater 70 that forms a forwardly directed extension of heater duct 72. Connected to the forward end of heater 70 is a forwardly extending air plenum 68, which defines an air intake that is positioned above, and just behind, the entrance 14 to the relief station 10.

In the currently preferred embodiments, the heater 70 uses the household hot water system to heat the air that flows from the heater and into heater duct 72. It will be recognized though, that many other types of heaters are possible, such as electric, natural gas, or liquid fuel powered with oil, kerosene or some other combustible liquid. Furthermore, the heater 70 can also serve as a sterilizer in conjunction with the dryer/conveyor 64 by heating the air to a temperature high enough to sterilize the litter.

In the depicted arrangement, air is drawn through the dryer/conveyor 64 (via air plenum 68, heater 70 and heater duct 72) by creating a negative (lower than ambient) pressure within litter storage bin 32. To establish this negative pressure, a fan 74 is mounted to panel 28 in the upper central portion of the pet reception area 30. Located adjacent to panel 28 and extending upwardly from an opening 130 in the upper panel 34 of litter storage bin 32, is a fan duct 78 that supplies air to fan 74. The drive shaft of a motor 76 that is mounted to the opposite wall of fan duct 78 drives fan 74 so that air is evacuated from the litter storage bin 32 via fan duct 78 and exhausted upwardly from fan 74 through a cylindrical exhaust 80. Preferably, circular exhaust 80 is sized to fit exhaust hoses of the type used for venting conventional clothes dryers, cooking grills, and other types of household ventilation units.

It will be readily apparent to those skilled in the art that instead of drawing air through the dryer/conveyor 64 to dry wet litter by creating a negative pressure within the litter storage bin 32, alternative embodiments could position the fan 74 to create a higher pressure in the dryer/conveyor 64, and create a flow of air through the dryer/conveyor 64 in that manner.

In the arrangement of the invention shown in FIGS. 1 and 2, the endless belt 16 is supported and driven by four rollers 82, 84, 86, 88 that extend the width of the endless belt 16. Rollers 84 and 88 are at the same elevation, and the upper surface of the section of the endless belt 16 extends between these two rollers to form the substantially horizontal floor of the pet reception area 30. The roller 88 drives the endless belt and is located at the right side of the pet reception area 30, directly underneath the dispensing roller 40 of litter storage bin 32. Roller 82 is located below and outward of roller 84 to direct endless belt 16 downwardly toward the collection chamber 42 in the previously described manner. Roller 86 is mounted above and inwardly of roller 82 to direct the lower surface of the endless belt 16 to a horizontal orientation.

Both the drive roller 88 and the dispensing roller 40 of the depicted embodiment are driven by an endless belt motor 90. Motor 90 is located at the upper right of the relief station 10, above the litter storage bin 32, being mounted to the inside of the front panel 22 of the pet relief station 10. The drive shaft of motor 90 extends perpendicularly through the front panel 22 to a drive pulley 92.

Encircling drive pulley 92 is a drive belt 94 that also is routed around three additional pulleys 96, 98, 100 that are mounted to shafts that pass through the front panel 22. In this arrangement, pulleys 98 and 100 drive storage bin dispensing roller 40 and the endless belt drive roller 88, respectively. Pulley 96 is an idler pulley positioned between pulleys 98 and 92 for maintaining proper tension in drive belt 94.

In the preferred embodiment, the pet relief station 10 is designed to fit beneath a counter or cabinet top and entirely within a bath or utility room cabinet. An entrance door on the front of the cabinet is aligned with the entrance 14 of the pet relief station 10. A flexible duct or hallway may be used to connect the cabinet entrance to entrance 14. In a similar manner, the pet relief station 10 can be mounted behind any wall constructed for the purpose of accommodating it, while separating it from the living space of the household. In an alternative embodiment, the complete pet relief station 10 may be housed in an appliance shell similar to the cabinets or shells of household washer and clothes dryer units.

As can be seen from FIG. 1, the three previously mentioned motors 66, 76, 90 are located in a relatively confined region directly above the litter storage bin 32. To provide ventilation and, thus, prevent overheating of the motors, three spaced-apart vent holes 102, 104, 106 are provided along the upper edge region of the panel 36 of pet relief station 10.

Located near the top of the front panel 22 of the pet reception area 30 is a status indicator 108. The status indicator 108 contains an on/off switch and a liquid crystal display or other such device for displaying the operational state of pet relief station 10. Directly behind the status indicator 108, mounted on the opposite side of the front panel 22 is a microprocessor 109 that controls the operation of the relief station 10 (FIG. 2).

FIG. 3 more clearly illustrates the separator/washer 54 of FIG. 1 with a portion of the structure depicted in FIG. 3 being cut away to show internal detail.

As can been seen in FIG. 3, the separator/washer input pipe 52 extends into separator/washer 54 and includes a ninety degree elbow for discharging a slurry of soiled litter and liquid downwardly into the central region of a separator/washer basket 132. The separator/washer basket 132 is substantially cylindrical, being closed at the bottom and being relatively open at the top. Surrounding basket 132 is a cylindrical shell 134 that forms the outer surface of separator/washer 54. The walls of the separator/washer basket 132 are composed of a screen or mesh which is sized to prevent passage of litter. As shall be recognized upon understanding the hereinafter described operation of the arrangement of FIG. 3, litter employed with separator/washer 54 must float in water (or any other wash fluid being used) and must maintain structural integrity when exposed to the wash fluid.

A vertical shaft 136 that is coincident with the vertical axis of both the separator/washer basket 132 and the outer cylindrical shell 134 passes upwardly from separator/washer 54. At its upper end, the shaft 136 connects to a motor 138 that is mounted on top of the separator/washer 54. At its opposite end, the shaft 136 is supported by a bearing 139 at the bottom, inside wall of outer cylindrical shell 134. The separator/washer basket 132 is affixed to and supported by the shaft 136. The motor 138 rotates or agitates the separator/washer basket 132, as will be explained in more detail, to provide cleansing action to litter deposited therein, and to collect the litter after it has been washed.

At the bottom of the separator/washer 54 is a drain line 140. The drain line 140 is connected to the previously described centrifugal pump 56, which pumps waste from the separator/washer 54. An output pipe 58, which extends from the centrifugal pump 56, is connected directly to the household drainage system.

Mounted near the bottom of the outer cylindrical shell 134 of the separator/washer 54 at a position below the separator/washer basket 132 are two nozzles 142 and 144. The nozzles 142 and 144 point directly upward so that fluid discharged from the nozzles will pass through the bottom mesh of the separator/washer basket 132 along paths that are substantially parallel to the vertical shaft 136. Mounted inside the separator/washer basket 136 are two more nozzles 146, 148 that point radially outward toward the vertical wall of the separator/washer basket 132. Liquid is supplied to the nozzles 142 and 144 through a pipe 150, and to nozzles 146 and 148 through a pipe 149. Both pipes 149 and 150 extend outwardly from separator/washer 54.

At the beginning of the separator/washer 54 cycle, relatively clean water is typically present in separator/washer 54 at a level corresponding to A in FIG. 3. The slurry of soiled litter and liquid is then pumped into the center of the washer separator/basket 132 by the collection chamber centrifugal pump 48 (shown in FIGS. 1 and 2) via the separator/washer input pipe 62, until the level of material in the separator/washer 54 is approximately equal to level B of FIG. 3.

When the level of material in the separator/washer 54 reaches level B, the separator/washer motor 138 is energized to rotate the cylindrical basket 132 in a clockwise direction, as viewed from above, and the centrifugal pump 56 is energized to discharge waste water to the household drain. Collectively, the concurrent operation of centrifugal pumps 48 and 56 maintains the level of water and litter in the separator/washer 54 at or somewhat below level B.

After a predetermined period of time, centrifugal pump 48 is de-energized so that no additional material is supplied to separator/washer 54. However, the centrifugal pump 56 continues to operate until the level of material in the separator/washer 54 drops to level C. At this point, clean rinse water is supplied to the separator/washer 54 via the upwardly directed nozzles 142 and 144 (located beneath the bottom of the separator/washer basket 132) and the radially directed nozzles 146 and 148 (located in the separator/washer basket 132). At this point, one skilled in the art can readily appreciate that cleansers and deodorants may also be injected, along with the rinse water, through the nozzles 142, 144, 146, and 148. As was noted, with respect to the endless belt spray nozzles 44, substances may also be injected through the nozzles to sterilize the soiled litter.

While clean rinse water is being supplied by the nozzles 142, 144, 146, and 148, the centrifugal pump 56 maintains the level of material in the separator/washer 54 in the range between levels A and B of FIG. 3. In addition, rotation of the separator/washer basket 132 is maintained to extract rinse water and waste materials outwardly through openings in the mesh or screen that forms the walls of the separator/washer basket 132.

After the litter has been thoroughly washed, rotation of the separator/washer basket 132 is halted. The centrifugal pump 56 is de-energized, allowing the level of material to increase to level D in the separator/washer 54 by injection of liquid from the nozzles 142, 144, 146, and 148. Then the separator/washer motor 138 is activated to drive separator/washer basket 132 in the reverse direction, i.e., counterclockwise as viewed from above, but at a relatively slow speed of rotation. Liquid and litter rotating with separator/washer basket 132 is swept into horizontally disposed intake flange 152, which is mounted near the top of the separator/washer basket 132 and connects to the separator/washer output pipe 62. This action causes litter floating to the upper surface of the liquid and a small amount of clean liquid to be discharged from the separator/washer 54 through the intake flange 152. When all of the cleansed litter has been collected in this manner, the liquid level is lowered to level A in preparation for the next inflow of materials into the separator/washer 54. A small amount of litter that is not discharged through the separator/washer output pipe 62 generally remains in the separator/washer 54 to undergo a repeat of the cycle, along with a new batch of solid litter.

A separator/washer 154 that can be employed in the practice of the invention as an alternative to separator/washer 54 is shown in FIG. 4, with part of the outer structure being cut away to reveal internal detail. The alternative separator/washer 154 is similar to separator/washer 54 in that it includes a cylindrical separator/washer basket 158 which is formed from a screen or mesh. However, separator/washer basket 158 is positioned with its longitudinal axis (axis of rotation) substantially horizontal, as opposed to the substantially vertical rotational axis of separator/washer 54.

As in the first type of separator/washer 54, it is necessary for the litter particles to retain physical integrity when exposed to a fluid bath. Preferably, the litter used in all embodiments of the invention consists of bead-like particles having a relatively hard outer surface that do not absorb moisture. In addition, the size of the litter particles must be greater than the size of the screen or mesh opening of the separator/washer basket 158. However, the litter used in embodiments of the invention that employ separator/washer 154 need not float in water.

Separator/washer 154 includes a housing 156 that encloses most of the internal elements of separator/washer 154. At the bottom of the housing 156, which concentrically surrounds separator/washer basket 156, is a drain 160 that connects to the previously described centrifugal pump 56 (shown in FIGS. 1, 2, and 3), which pumps waste out of the separator/washer 154 and into the household drainage system.

In operation, the slurry of soiled litter and liquid that is delivered to the collection chamber 42 is pumped into the separator/washer basket 158 via the separator/washer input pipe 52 by the operation of the collection chamber centrifugal pump 48 (shown in FIGS. 1 and 2). The separator/washer input pipe 52 enters the separator/washer basket 158 just below and to the right of the longitudinal axis of the separator/washer basket 158 (with reference to the view shown in FIG. 4), and includes an elbow at its inward terminus so that the input material (soiled litter and water) is discharged radially towards the wall of the separator/washer basket 158. This discharge path causes the soiled litter to be substantially evenly distributed on the surface of separator/washer basket 158, as the separator/basket 158 rotates about the separator/washer input pipe 52.

The separator/washer output pipe 62, which removes clean litter from the separator/washer 154, enters the separator/washer basket 158 somewhat above and slightly to the left of the longitudinal axis of the separator/washer basket 158 as shown in FIG. 4. The portion of the separator/washer output pipe 62 that extends into the separator/washer basket 158 is configured to form an upward opening through-like region, with output pipe 62 being sloped upwardly so that material deposited in the trough-like region will flow downwardly and into the output pipe. Located inside the separator/washer basket 158 are nozzles 162 and 164 for spraying liquid radially outward toward the separator/washer basket 158 with liquid being supplied to the nozzles 162 and 164 through a pipe 168.

The separator/washer basket 158 of FIG. 4 is driven by a motor 170 that is mounted to the side of the separator/washer housing 156 opposite the location of the input and output pipes 52 and 62. The motor 170 rotates to the separator/washer basket 158 about its horizontal axis.

Operation of the separator/washer 154 is as follows. Prior to the inflow of any material from the separator/washer input pipe 52, the separator/washer basket 158 is rotated in the counterclockwise direction, as viewed from the side that the input and output pipes 52 and 62 enter the separator/washer 154, i.e., in the direction indicated by the arrow shown in FIG. 4. Throughout the counterclockwise rotation, sufficient rotational speed is maintained such that litter is held against the wall of separator/washer basket 158 by centrifugal force.

During the counterclockwise rotation, the spray nozzles 162 and 164 are activated to spray liquid radially outwards to cleanse the litter. As in the separator/washer 54, cleansers and disinfectants can be injected along with water (or other fluid being employed). During the period that the spray nozzles 162, 164 are operating, the centrifugal pump 56 (shown in FIGS. 1, 2, and 3) is energized to continually pump liquid from the separator/washer 154 via drain 160 and thereby prevent accumulation of liquid in the separator/washer 154.

When a sufficient amount of soiled litter and liquid has been supplied, further inflow is stopped. However, the spray nozzles 162, 164 continue to operate until the litter is cleansed thoroughly. Thereafter, the rate of rotation of the horizontal axis-type separator/washer basket 158 is gradually reduced to a rate at which the litter falls away from the top of the circular path that is traced out by the litter rotating with separator/washer basket 158. The falling litter is caught by the trough-like region of the separator/washer output pipe 62. Accompanied by a small amount of the rinse water, the litter flows downwardly under gravitational force through output pipe 62.

It will be noted that the recycler 20 can be embodied as a free-standing unit for cleansing litter after use in one of the commonly used types of pet relief stations (such as a litter box). That is, the recycler 20 need not be incorporated in a pet relief station 10, but can be a separate unit consisting of the separator/washer 54 and dryer/conveyor 64. In such an arrangement, soiled litter need not be pumped into the separator/washer 54, but can be input manually by the pet owner through various devices such as a hopper. Similarly, a box or other repository can be used to collect dry, clean litter expelled by dryer/conveyor 64, which can then be reused in a litter box by the pet owner. Such a freestanding recycler can include either the currently preferred separator/washer 54, or the alternative separator/washer 154.

Figure 5:
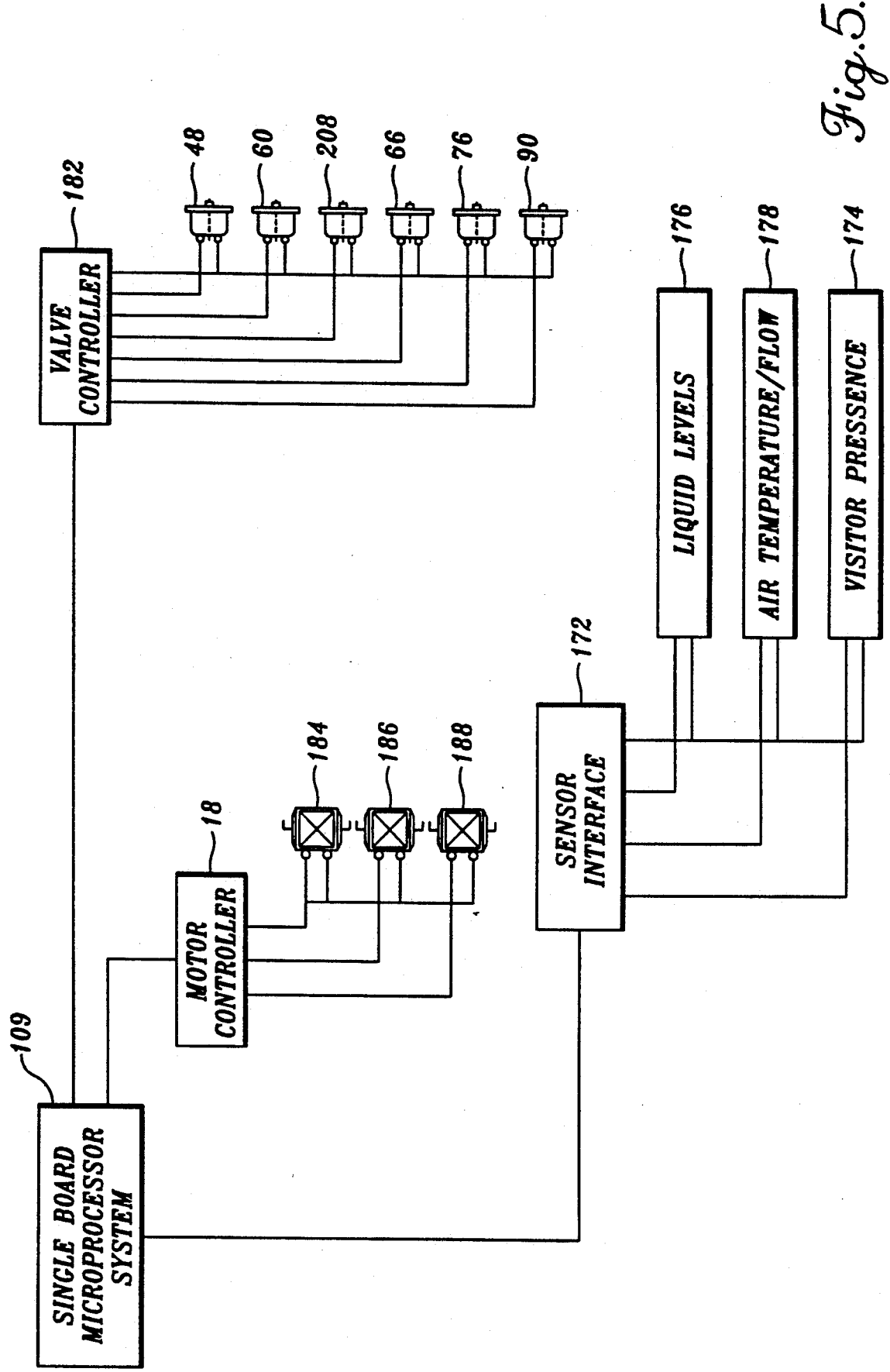
FIG. 5 is a block diagram of a control system that can be used to implement the various automatic features of the present invention.

A block diagram of a representative control system for the pet relief station 10 is shown in FIG. 5. Upon understanding the logic necessary to control the relief station 10, it will be recognized that the single microprocessor 109 (indicated in FIGS. 2 and 5) or alternatively, a programmable logic controller, provides sufficient sequence control capability.

In the arrangement shown in FIG. 5, the microprocessor 109 receives input signals from a sensor interface 172, which is connected for receiving signals from a visitor presence sensor 174, liquid level sensors 176, and air temperature and flow sensors 178.

The visitor presence sensor 174 is a pressure sensor or other device that senses whether a pet is in pet reception area 30 of relief station 10. Liquid level sensors 176 are located in the washer/separator 54 and the centrifugal pump 48 (which pumps the inflow material to the separator/washer 54) to sense liquid level in the components in which they are located. Air temperature and flow sensors 178 sense whether air is flowing through the dryer/conveyor 64 and, in addition, sense the temperature of air within dryer/conveyor 64. The sensor interface receives the outputs from the sensors 174, 176, 178 and, if necessary, processes the signals so that they are in a digitally-encoded format that is compatible with the microprocessor 109.

Based on the information provided by the sensors 174, 176, and 178, the microprocessor 109 issues command signals to valve and motor controllers 180 and 182 to respectively operate a valve or activate one of the system motors. Various valve and motor controllers that are responsive to microprocessor-generated command signals are known in the art.

In the preferred embodiments of the invention, the heater 70 uses hot water from the household hot water system, with a valve 184 of FIG. 5 being used to control flow of hot water into the heater 70 in response to signals provided by valve controller 180. Valve controller 180 also opens or closes valve 186, which supplies water to the spray nozzles 44 that are located above the endless belt 16. The valve controller 180 also controls a valve 188, which supplies water to the spray nozzles in the separator/washer 54 (nozzles 142, 144, 146, and 148 in FIG. 3).

The motor controller 182 controls all six motors employed in the pet relief station 10 of FIGS. 1 and 2. This includes the motors 50, 60, which respectively drive centrifugal pumps 48 and 56; the motor 66 that powers the screw conveyor 116 of dryer/conveyor 64; and the fan motor 76. Also included is the motor 90 that drives both the endless belt 16 and the dispensing roller 40 and the motor that powers the separator/washer 54 (e.g., motor 138 of separator/washer 54; motor 170 of separator/washer 154).

Figures 6, 7:
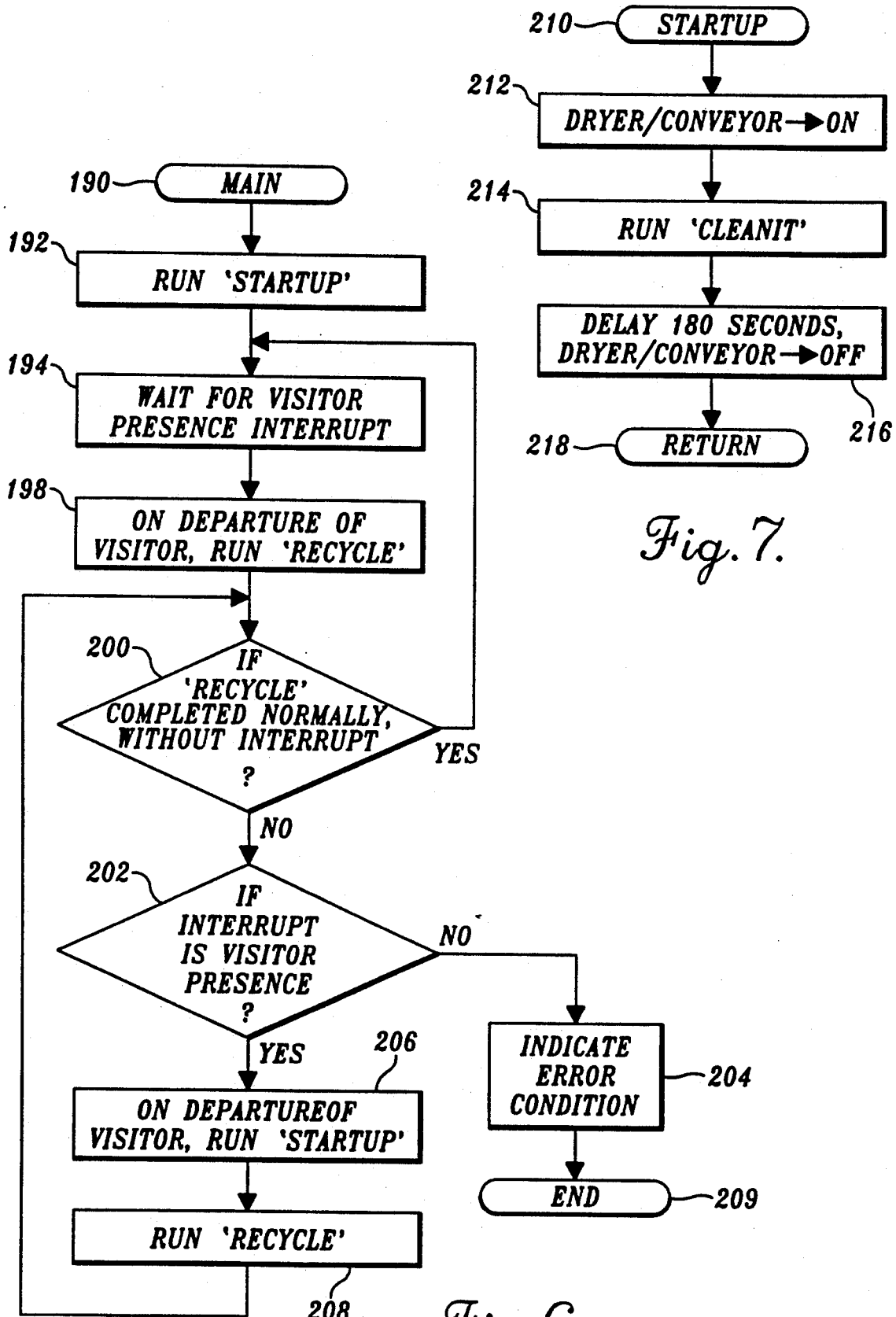
FIG. 6 is a flow chart showing a sequence of operation that is suitable for controlling a device constructed in accordance with the present invention.
FIG. 7 is a flow chart that illustrates a logic sequence that is executed on start-up of a device constructed in accordance with the present invention.

An overall logic sequence for controlling a device constructed in accordance with the present invention is illustrated in FIG. 6. As shall become apparent from the following description, the depicted logic system uses hardwired interrupts from the sensor interface 172, with one such interrupt is generated in response to signals supplied by visitor presence sensor 174. After a start block 190, an initialization routine identified as "STARTUP" is executed (indicated at block 192). STARTUP sequences the separator/washer 54 and dryer/conveyor 64 to ensure that these units are completely clear of materials and in a state to commence processing of a subsequent charge of materials.

Following an entry and departure of the visitor (as determined by the visitor presence sensor 174), a routine identified as "RECYCLE" is executed (block 198 of FIG. 6). Following execution of the "RECYCLE" routine, it is determined whether the "RECYCLE" routine was completed normally, that is, whether the routine was executed without receiving any interrupt (indicated by decision block 200). If so, the logic recycles to block 194 to wait for another interrupt generated by the presence of a visitor.

If another interrupt was received during the execution of the "RECYCLE" routine, decision block 202 determines if this was generated by another visitor. If so, upon departure of the visitor, the initialization routine "STARTUP" is again executed at block 206. This is followed by execution of the "RECYCLE" routine at block 208, with the logic returning to decision block 200 to again determine if the "RECYCLE" routine completed successfully, without receipt of another interrupt.

If it is determined at decision block 202 that "RECYCLE" routine was interrupted by something other than another visitor, an error condition is set and displayed by the status indicator 108 (indicated at block 204). In the practice of the invention, hardwired interrupts can be provided to indicate pump and motor failures and various other malfunctions or errors which can be detected at block 204 of FIG. 6 to generate a suitable error message on the status indicator 108. As is indicated in FIG. 6, detection of any such malfunction results in the termination of the logic sequence (at block 209). Following correction of the error condition, the logic can be manually restarted at start block 190.

Logic suitable for the initialization routine "STARTUP" is shown in FIG. 7. After initialization (start block 210), the dryer/conveyor 64 is set to "ON" (block 212) by energizing both dryer/conveyor motor 66 and the fan motor 76. Next, a routine identified as "CLEANIT" is executed (block 214). Following this, a 180-second time delay is implemented before the dryer/conveyor 64 is turned "OFF" (block 216). The purpose of the delay is to ensure that any wet litter present in the dryer/conveyor 64 is dried and conveyed to the litter storage bin 32. Once the dryer/conveyor 64 is off, the routine of FIG. 7 returns control to the calling routine of FIG. 6 (indicated at block 218).

Figure 8:
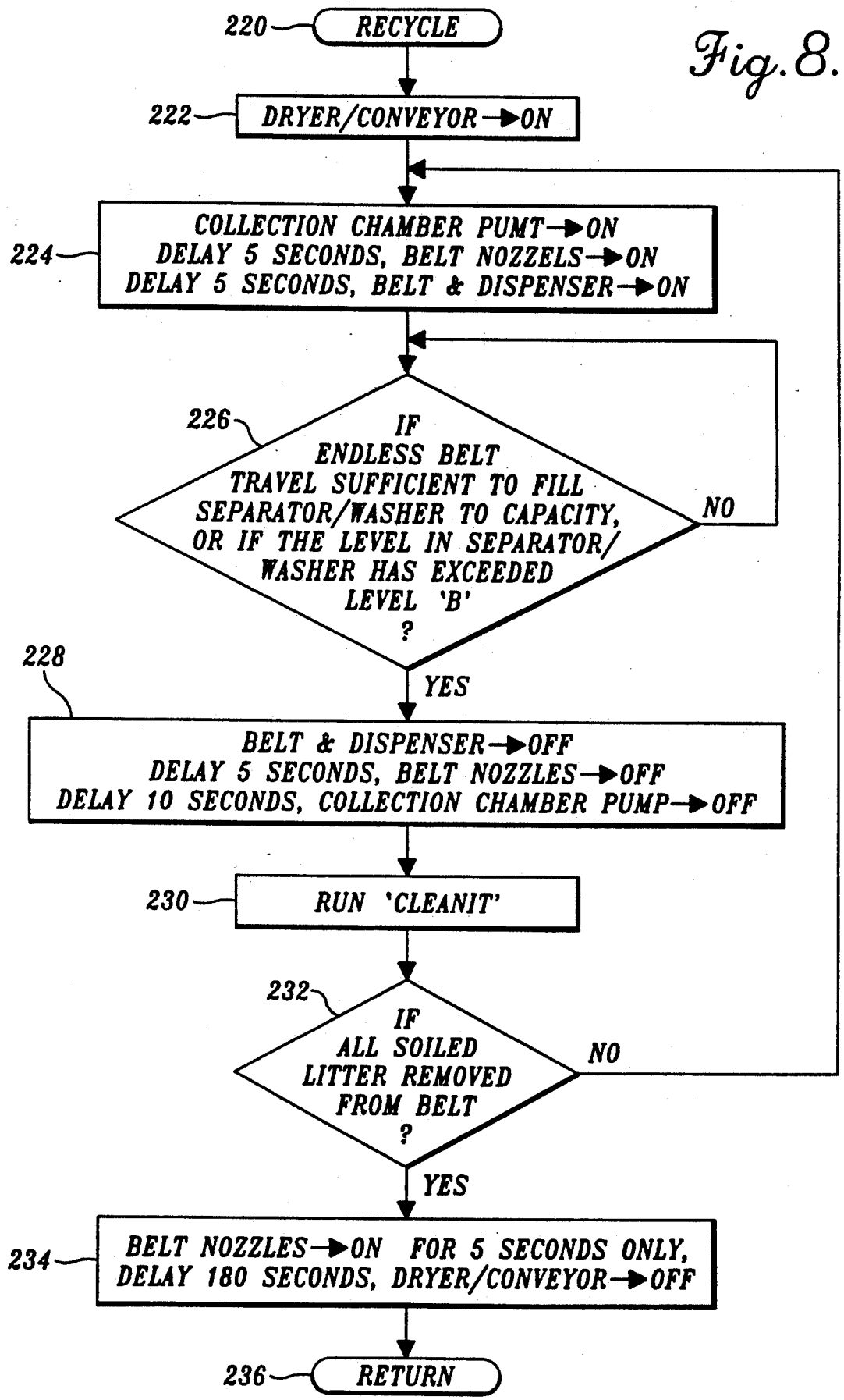
FIG. 8 is a flow chart showing the logic implemented for controlling the recycling process of a device constructed in accordance with the present invention.

FIG. 8 shows logic for the "RECYCLE" routine (198 in FIG. 6). After initialization (start block 220), the dryer/conveyor 64 is turned "ON" at block 222. Next, the collection chamber pump 48 is turned "ON"; a five-second delay is implemented; the endless belt spray nozzles 44 are turned "ON"; another five-second delay is implemented; and the motor 90 is turned "ON" to drive the endless belt 16 and the litter dispensing roller 40 (all indicated at block 224).

Next, a determination is made at decision block 226 as to whether the endless belt 16 has traveled a distance that will deposit sufficient soiled litter in the collection chamber 42 for filling the separator/washer 54 to capacity. This determination is made by computing the distance the endless belt 16 has traveled, e.g., multiplying the rate at which the endless belt 16 travels by the time since it started traveling.

If the endless belt 16 has not traveled far enough to fill the separator/washer 54 to capacity, the decision block 226 is repeatedly executed until the result is affirmative. An affirmative determination in decision block 226 results in the motor 90 that drives the endless belt 16 and litter dispensing roller 40 being turned "OFF" and the endless belt spray nozzles 44 being turned "OFF" after a five-second delay (block 228). After the spray nozzles 44 are shut "OFF," there is a ten second delay, after which the collection chamber pump 48 is also shut off (also indicated at block 228).

Following this, the routine "CLEANIT" is executed (block 230). After the control is returned to "RECYCLE" from routine "CLEANIT," a determination is made at decision block 232 as to whether the endless belt has traveled far enough to have completely replaced all of the soiled litter with clean litter. This determination can also be made by multiplying the rate at which endless belt 16 travels by time traveled. If the answer is negative, the logic sequence is repeated, beginning with block 224.

If the determination at decision block 228 is affirmative, the endless belt nozzles 44 are turned on for five seconds, and after a delay of 180 seconds, the dryer/conveyor 64 is turned off (block 234). Turning on the endless belt nozzles 44 for five seconds fills the collection chamber pump 48 with clean liquid to form the previously mentioned drain trap and prevent odors from escaping from the separator/washer input pipe 52. Delaying the dryer/conveyor 64 shut-off for 180 seconds ensures that all litter present in the dryer/conveyor 64 has been dried and deposited in the litter storage bin 32. Once dryer/conveyor 64 is shut off, the sequence returns control to the calling routine (block 236).

Figure 9:
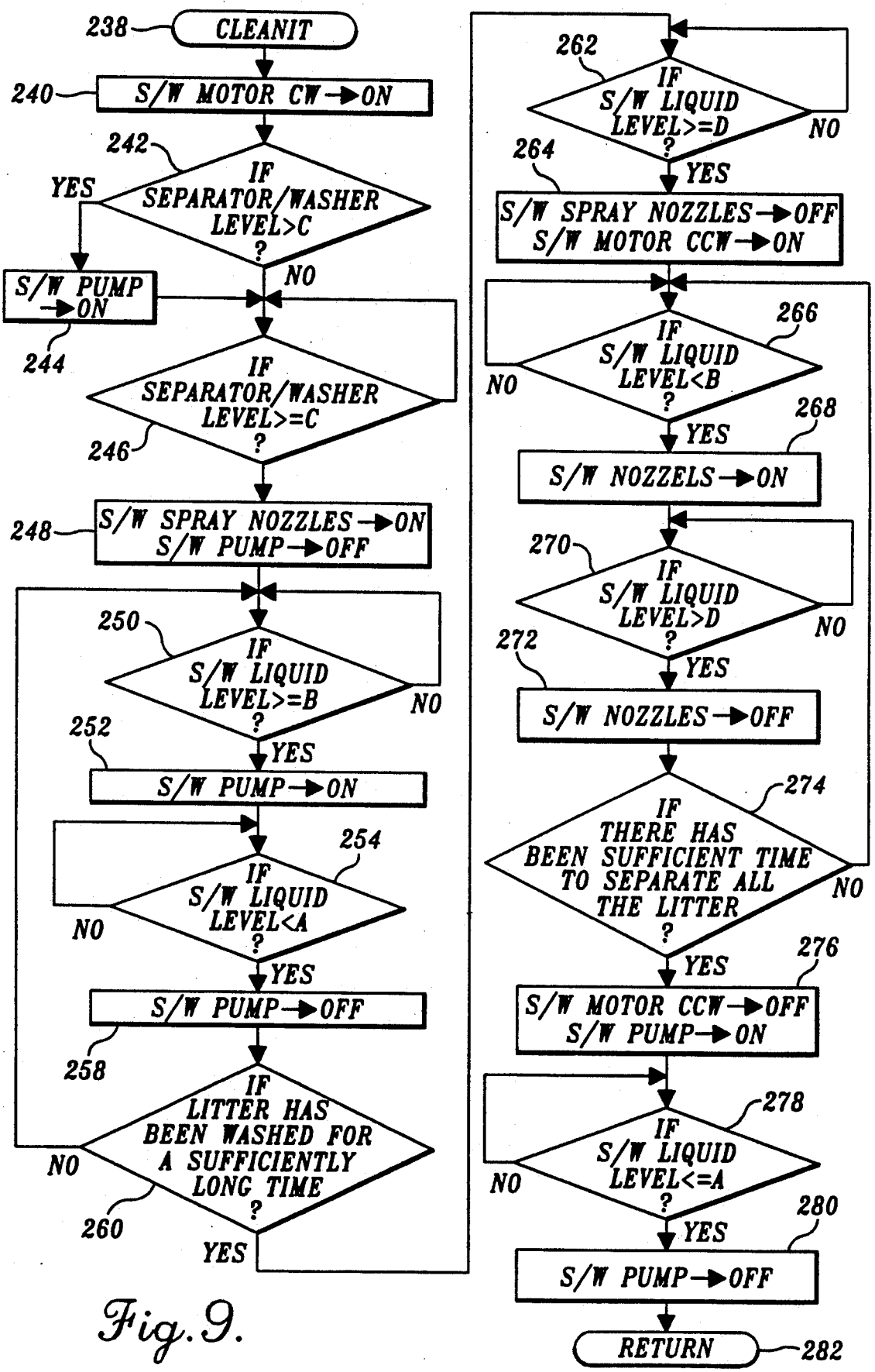
FIG. 9 is a flow chart showing the logic implemented for controlling a separator/washer in a device constructed in accordance with the present invention.

FIG. 9 shows the logic for the "CLEANIT" routine, which controls the operation of the separator/washer 54. The logic shown is specifically directed to the currently preferred separator/washer 54.

After the start block 238, the separator/washer motor 138 is activated for clockwise rotation (block 24). Next, it is determined at decision block 242 whether the liquid level in the separator/washer 54 is greater than level C, as shown in FIG. 3. If it is, the pump 58 that drains the separator/washer is turned "ON," otherwise the logic proceeds to decision block 246. Decision block 246 determines whether the liquid level in the separator/washer 54 is less than or equal to level C. If not, decision block 246 is repeated until the answer is affirmative.

After receipt of an affirmative answer at decision block 246, the separator/washer spray nozzles 142, 144, 146, and 148 of FIG. 3 are turned "ON" and the separator/washer pump 56 is turned "OFF" (indicated at block 248). Next, it is determined at decision block 250 whether the liquid level in the separator/washer 54 is greater than or equal to level B of FIG. 3. If not, the inquiry is repeated until an affirmative answer is received.

Upon receipt of an affirmative answer, the separator/washer pump 56 is turned "ON" (block 252) and a determination is made at decision block 254 as to whether the liquid level in the separator/washer 54 is less than level A. A negative determination results in the repetition of decision block 254, until an affirmative answer is received.

When the liquid level is less than level A of FIG. 3, the separator/washer pump 56 is turned "OFF" (block 258). Following this, an inquiry is made as to whether the litter has been washed for a period of time that is sufficient to clean it (decision block 260). A negative answer results in repeating the logic sequence, starting at block 250. An affirmative answer results in the execution of decision block 262, which inquires whether the liquid level in the separator/washer 54 is greater than or equal to level D. A negative indication results in the re-execution of decision block 262 until an affirmative answer is received.

When the liquid level is greater than or equal to level D, the separator/washer nozzles 142, 144, 146, and 148 are turned "OFF," and the separator/washer motor 138 is turned "ON" for counter clockwise rotation (block 264). As described relative to FIG. 3, this results in clean litter being collected at the intake flange 152 of the washer/separator 54. Next, a determination is made as to whether the liquid level in the separator/washer 54 is less than level B (indicated at decision block 266). A negative determination results in repetition of the inquiry, until an affirmative answer is received.

When it is determined that the liquid level is less than level B, the separator/washer nozzles 142, 144, 146, and 148 are turned "ON" (block 268). An inquiry is then made to determine if the liquid level in the separator/washer 54 is greater than level D (decision block 270). A negative answer results in the repetition of the inquiry until an affirmative answer is received, while an affirmative answer results in the nozzles 142, 144, 146, and 148 being turned "OFF" (block 272). Maintaining liquid level greater than level D ensures that the liquid level in the separator/washer 54 will cause clean litter to be collected by the intake flange 152 of FIG. 3 as the separator/washer basket 132 continues to slowly rotate.

Next, a determination is made at decision block 274 as to whether there has been sufficient time to separate substantially all of the clean litter from the liquid. If there has not been sufficient time, the logic is repeated, starting with block 266. Otherwise, the separator/washer motor 138 is turned off, pump 56 is turned "ON," and a final inquiry is made to determine if the liquid level in the separator/washer 54 is less than or equal to level A (block 278). A negative determination results in the repetition of the inquiry until an affirmative answer is received, while an affirmative answer results in the separator/washer pump 56 being turned "OFF" (block 280). The final block 282 of FIG. 9 returns control to the calling routine.

While the preferred embodiments of the invention have been illustrated and described, it will be appreciated that various changes can be made therein without departing from the spirit and scope of the invention. For example, the endless belt 16 for supporting the litter and the animal could be replaced with items including, but not limited to, a large rotatable disk or a tray with a trap door that dumps soiled litter into the collection chamber 42. As previously mentioned the screw conveyor 116 could be replaced with items including, but not limited to, a bucket conveyor, an endless belt conveyor, or a movable hopper on an elevator mechanism.

The embodiments of the invention in which an exclusive property or privilege is claimed are defined as follows:

1. A pet relief station comprising:
   (a) a housing with an opening to permit a pet to enter and exit said housing;

(b) support means within said housing for supporting a pet entering said housing;

(c) a dispenser positioned within said housing for distributing litter on said support means; and (d) recycler means positioned for collecting soiled litter from said support means, said recycler means including means for cleansing said soiled litter and for reusing the cleansed litter.

2. A pet relief station as in claim 1, wherein said recycler means further includes conveying means for conveying cleansed litter to said dispenser and for depositing the conveyed cleansed litter in said dispenser for re-use.

3. A pet relief station as in claim 2, wherein said conveying means includes a dryer for drying said cleansed litter before said cleansed litter is deposited in said dispenser for reuse.

4. A pet relief station as in claim 1, wherein said recycler means further includes:

(a) a collection chamber for collection of said soiled litter, said collection chamber being positioned to accept said soiled litter from said support means; and (b) an evacuator to remove and cleanse soiled litter from said collection chamber.

5. A pet relief station as in claim 1, wherein said recycler further includes a separator/washer to cleanse said soiled litter and substantially separate said cleansed litter from any liquid.

6. A pet relief station as in claim 5, wherein said separator/washer includes:

(a) a first chamber;

(b) a second chamber disposed within said first chamber with said second chamber being rotatable about its vertical axis;

(c) said second chamber being composed of a mesh-type material that allows only the passage of fluids and solid particles smaller than a predetermined size;

(d) at least one valve in fluid communication with at least one of said first and second chambers, each said valves for introducing at least one cleansing liquid into at least one of said chambers;

(e) a motor connected to said second chamber for driving said second chamber about its vertical axis within said first chamber;

(f) at least one pump having an intake coupled to at least one of said chambers, each said pump for evacuating fluid from said chambers; and (g) an intake flange for separating said cleansed litter from liquid contained by said second chamber, said intake flange being positioned for collection of litter that floats to the surface of said liquid contained by said second chamber.

7. A pet relief station as in claim 5, wherein said separator/washer includes:

(a) a first chamber;

(b) a second chamber disposed within said first chamber, and mounted for rotation about a horizontal axis;

(c) said second chamber being formed of a mesh-type material that allows the passage of fluids and solid particles smaller than a predetermined size;

(d) at least one valve in fluid communication with at least one of said first and second chambers, for introducing at least one cleansing liquid into at least one of said first and second chambers;

(e) a motor connected to said second chamber for rotating said second chamber about its horizontal axis within said first chamber;

(f) at least one pump having an intake opening coupled to at least one of said first and second chambers for evacuating fluid from said chambers; and (g) an intake flange positioned within said second chamber, said intake flange being positioned to collect said cleansed litter as it falls from the upper region of said second chamber, while said second chamber is rotated at a rate to move said cleansed litter along a path defined by said rotating second chamber until gravity overcomes centrifugal effects within said rotating second chamber, causing said cleansed litter to fall away from the wall of said rotating second chamber.

8. A pet relief station as in claim 1, wherein said recycler further includes:

(a) a conveyor enclosed by a duct having an entrance and exit, said duct entrance receiving wet cleansed litter, and said duct exit expelling dry cleansed litter;

(b) a fan positioned to induce a draft of drying air through said duct to aid in drying said wet cleansed litter;

(c) a heater positioned to heat the draft of drying air induced to flow through said duct by said fan; and (d) a motor positioned to provide power to said conveyor, thereby conveying said cleansed litter through said duct.

9. A pet relief station as in claim 1, wherein said dispenser further includes:

(a) a hopper to store clean litter; and (b) a spreader positioned to distribute clean litter from said hopper onto said support means.

10. A pet relief station as in claim 1, wherein said dispenser includes a plurality of walls to contain clean litter, wherein said plurality of walls defines a first opening to receive cleansed litter from said recycler, and said plurality of walls defines a second opening for exiting of said cleansed litter.

11. A pet relief station as in claim 1, wherein said dispenser includes a spreader for distributing said clean litter onto said support means.

12. A pet relief station as in claim 1 further comprising a control system for automatically activating an operational sequence during which said recycler collects soiled litter from said support means and cleanses said soiled litter, and said dispenser replaces said soiled litter with clean litter.

13. A pet relief station as in claim 12 further comprising a sensor that supplies a signal when a visitor enters said pet relief station to initiate said operational sequence.

14. A pet relief station as in claim 1, wherein said recycler further comprises a sterilizer to sterilize recycled litter.

15. A pet relief station as in claim 1, wherein said pet relief station further comprises spray nozzles to wash soiled litter from said support means into said recycler.

16. A pet relief station as in claim 1, wherein said support means comprises an endless belt supported by a plurality of rollers, said plurality of rollers supporting a first end portion of said endless belt in a substantially horizontal position, and directing the second end portion of said endless belt at a downward angle.

17. A pet relief station as in claim 16, wherein said pet relief station further comprises spray nozzles to wash soiled litter from said second end portion of said endless belt and into said recycler.

18. A separator/washer for cleansing soiled litter in a fluid bath and substantially said cleansed litter from the liquid, wherein said litter is composed of washable particles that float in water, and said separator/washer comprises:
   (a) a first chamber;
   (b) a second chamber disposed within said first chamber, with said second chamber being mounted for rotation about its vertical axis within said first chamber;
   (c) said second chamber being formed of a mesh-type material that allows the passage of fluids and solid particles smaller than a predetermined size;
   (d) at least one valve in fluid communication with at least one of said chambers for introducing at least one cleansing liquid into at least one of said chambers;
   (e) a motor connected to said second chamber, said motor operable for rotation of said second chamber about its vertical axis within said first chamber;
   (f) at least one pump having an intake coupled to at least one of said chambers for evaluating fluid from said chambers; and
   (g) an intake flange positioned to collect said cleansed litter that floats to the surface of said at least one cleansing liquid, said intake flange for substantially separating said cleansed litter from said liquid.

19. A method of cleansing soiled litter and substantially separating said cleansed litter from a wash liquid, wherein said litter is composed of washable particles that float in water, said method comprising the steps of:
   (a) placing said soiled litter in a chamber;
   (b) injecting at least one cleansing liquid into said chamber;
   (c) providing motion to said chamber to provide cleansing action;
   (d) rinsing said cleansed litter;
   (e) filling said chamber with rinse liquid to substantially the level of an intake flange within said chamber, thereby floating said cleansed litter to substantially the level of said intake flange; and
   (f) rotating said rinse liquid within said chamber so that said cleansed litter and a minor amount of said rinse liquid is swept into said intake flange, while adding a sufficient quantity of said rinse liquid to maintain the level of liquid in said chamber at substantially the level of said intake flange until substantially all said cleansed litter is collected in said intake flange.

20. A separator/washer to cleanse soiled litter and substantially separate cleansed litter from wash liquid, wherein the litter is composed of washable particles, said separator/washer comprising:
   (a) a first chamber;
   (b) a second chamber disposed within said first chamber and mounted for rotation about a horizontal axis;
   (c) said second chamber being formed of a mesh-type material that allows the passage of fluids and solid particles smaller than a predetermined size;
   (d) at least one valve in fluid communication with at least one of said first and second chambers for introducing at least one cleansing liquid into at least one of said first and second chambers;
   (e) a motor connected to said second chamber for rotating said second chamber about its horizontal axis within said first chamber;
   (f) at least one pump having an intake opening coupled to at least one of said first and second chambers for evacuating fluid from said chambers; and
   (g) an intake flange positioned within said second chamber, said intake flange being positioned to collect said cleansed litter as it falls from the upper region of said second chamber, while said second chamber is rotated at a rate to move said cleansed litter along a path defined by said rotating said second chamber until gravity overcomes centrifugal effects within said rotating second chamber, causing said cleansed litter to fall away from the wall of said rotating second chamber.

21. A method of cleansing soiled litter and substantially separating cleansed litter from a wash liquid, wherein said litter is composed of washable particles and said method comprises the steps of:
   (a) placing said soiled litter in a cylindrical chamber, with the longitudinal axis of said cylindrical chamber substantially horizontal and said cylindrical chamber is a mesh-type material that allows the passage of fluid and solid particles smaller than said washable litter particles;
   (b) rotating said cylindrical chamber about its horizontal axis at a rate sufficient to establish centrifugal force that forces soiled litter against the walls of said rotating cylindrical chamber, even at the topmost part of each revolution of said cylindrical chamber;
   (c) injecting at least one cleansing liquid into said cylindrical chamber to cleanse said soiled litter; and
   (d) collecting said cleansed litter by reducing the rotation rate of said cylindrical chamber to a rate where the cleansed litter falls from said cylindrical chamber as it reaches said topmost part of a revolution of said cylindrical chamber, said cleansed litter being trapped in a trough that opens upwardly into said cylindrical chamber.

22. Soiled litter recycler that cleanses litter for re-use comprising:
   (a) a separator/washer having means for receiving said soiled litter, cleansing said soiled litter in a liquid bath, and substantially separating said cleansed litter from the liquid bath; and
   (b) a conveyor having means for drying cleansed litter and dispensing said dry cleansed litter from said recycler.

23. The recycler of claim 22, wherein said separator/washer includes:
   (a) a first chamber;
   (b) a second chamber disposed within said first chamber with said second chamber being rotatable about its vertical axis;
   (c) said second chamber being composed of a mesh-type material that allows only the passage of fluids and solid particles smaller than a predetermined size;
   (d) at least one valve in fluid communication with at least one of said first and second chambers, each said valves for introducing at least one cleansing liquid into at least one of said chambers;
   (e) a motor connected to said second chamber for driving said second chamber about its vertical axis within said first chamber;

(f) at least one pump having an intake coupled to at least one of said chambers, each said pump for evacuating fluid from said chambers; and (g) an intake flange for separating said cleansed litter from liquid contained by said second chamber, said intake flange being positioned for collection of litter that floats to the surface of said liquid contained by said second chamber.

24. The recycler of claim 22, wherein said separator/washer includes:

(a) a first chamber;

(b) a second chamber disposed within said first chamber and mounted for rotation about a horizontal axis;

(c) said second chamber being formed of a mesh-type material that allows the passage of fluids and solid particles smaller than a predetermined size;

(d) at least one valve in fluid communication with at least one of said first and second chambers for introducing at least one cleansing liquid into at least one of said first and second chambers;

(e) a motor connected to said second chamber for rotating said second chamber about its horizontal axis within said first chamber;

(f) at least one pump having an intake opening coupled to at least one of said first and second chambers for evacuating fluid from said chambers; and (g) an intake flange positioned with said second chamber, said intake flange being positioned to collect said cleansed litter as it falls from the upper region of said second chamber, while said second chamber is rotated at a rate to move said cleansed litter along a path defined by said rotating said second chamber until gravity overcomes centrifugal effects within said rotating second chamber, causing said cleansed litter to fall away from the wall of said rotating second chamber.

25. The recycler of claim 22, further comprising:

(a) a motor-driven conveyor;

(b) a duct enclosing said conveyor, said duct having an entrance and exit, said duct entrance for receiving wet cleansed litter and said duct exit for expelling dry cleansed litter;

(c) a fan positioned to induce a draft of drying air through said duct to aid in drying said wet cleansed litter;

(d) a heater positioned to heat the draft of drying air induced to flow through said duct by said fan; and (e) a motor mounted for providing power to said conveyor, thereby conveying said cleansed litter through said duct.

* * * * *